Jan. 10, 1956 H. L. DANIELS ET AL 2,730,698
POSITION INDICATING APPARATUS
Filed March 26, 1951 2 Sheets-Sheet 2

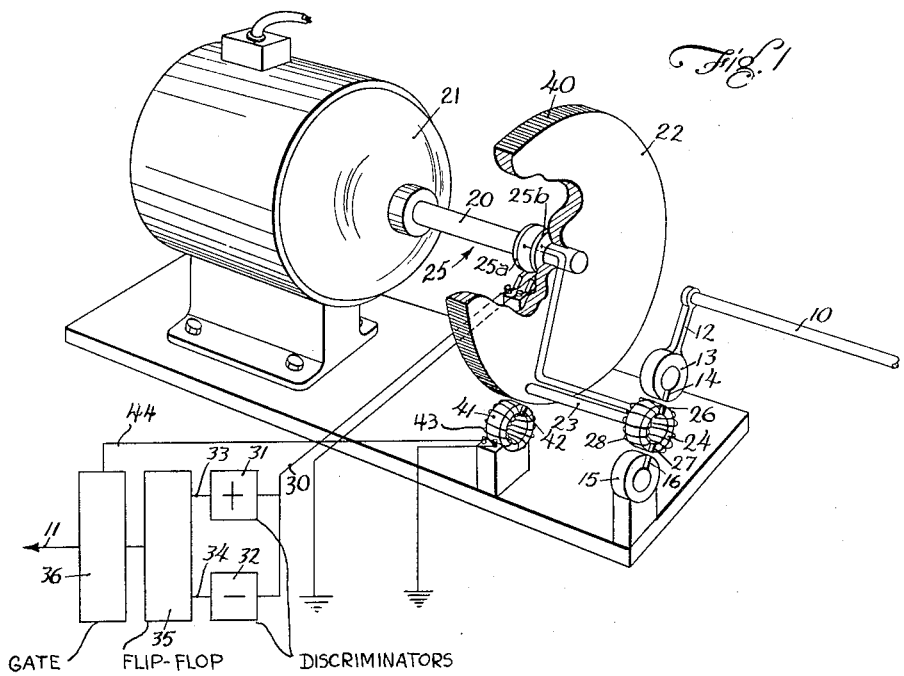
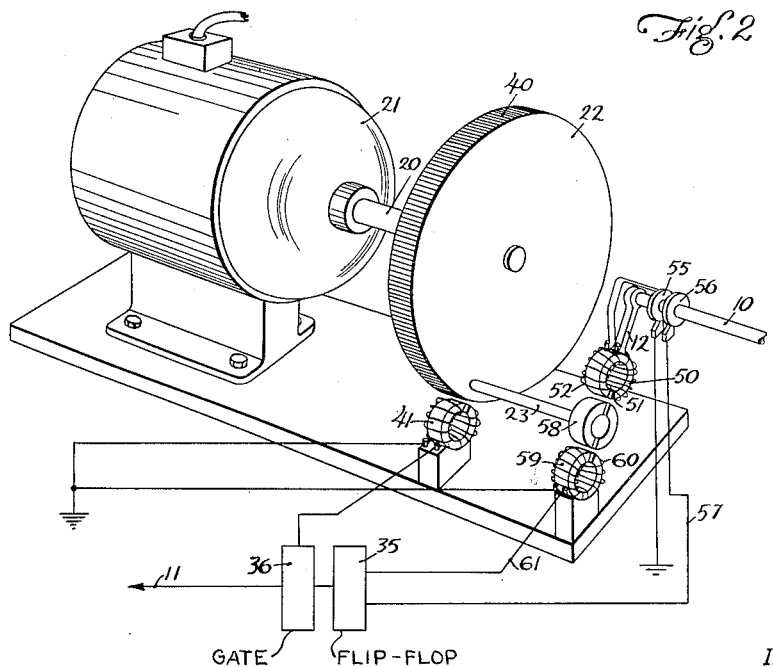

Inventors
Howard L. Daniels
John W. Hogan by Cushman, Darby & Cushman
Attorneys

United States Patent Office 2,730,698
Patented Jan. 10, 1956

2,730,698
POSITION INDICATING APPARATUS

Howard L. Daniels, St. Paul, and John W. Hogan, Minneapolis, Minn., assignors, by mesne assignments, to Sperry Rand Corporation, New York, N. Y., a corporation of Delaware Application March 26, 1951, Serial No. 217,454

1 Claim. (Cl. 340—206)

This invention relates to apparatus for indicating position, such as the angular position of a rotatable shaft or the like.

More particularly, this invention discloses a means for making a position indication in digital form rather than in the form of magnitudes, as has been the customary practice in prior art devices. Stated otherwise, indications of angular or other positions by this invention are presented in a digital form as a series of pulses, the number of pulses rather than their magnitude being the indicating quantity. As a result, indications which are obtained from the practice of this invention are substantially independent of voltage fluctuations or the fluctuations of other magnitudes.

The invention may have utility in many applications, one of which, as an example, may be indicating the angular position of wind direction indicating equipment.

It is a primary object of the invention to provide novel position indicating apparatus.

It is a further object of this invention to furnish a digital indication of angular position.

It is a further object of this invention to furnish a digital indication of angular position of any device which may assume various angular positions.

It is a further object of this invention to furnish a digital indication of angular position, such digital indication to be in the form of electronic pulses.

It is a further object of this invention to provide position indications using techniques which are primarily electromagnetic.

It is a further object of this invention to provide position indications in apparatus having a minimum of inertia or frictional loading on the input member.

It is a further object of this invention to provide position indicating apparatus which is rugged, durable, and relatively free from any delicate parts or components.

It is a further object of this invention to provide position indicating apparatus in which the resulting indications are truly representative of the exact shaft position at the precise instant when a reading is called for.

Further objects and the entire scope of the invention will become more fully apparent from the following detailed description and the appended claims.

The invention may be fully understood with reference to the accompanying drawings in which:

Figure 1 is a diagrammatic illustration of one embodiment of the invention.

Figure 2 is yet another embodiment of the invention.

Figure 3:
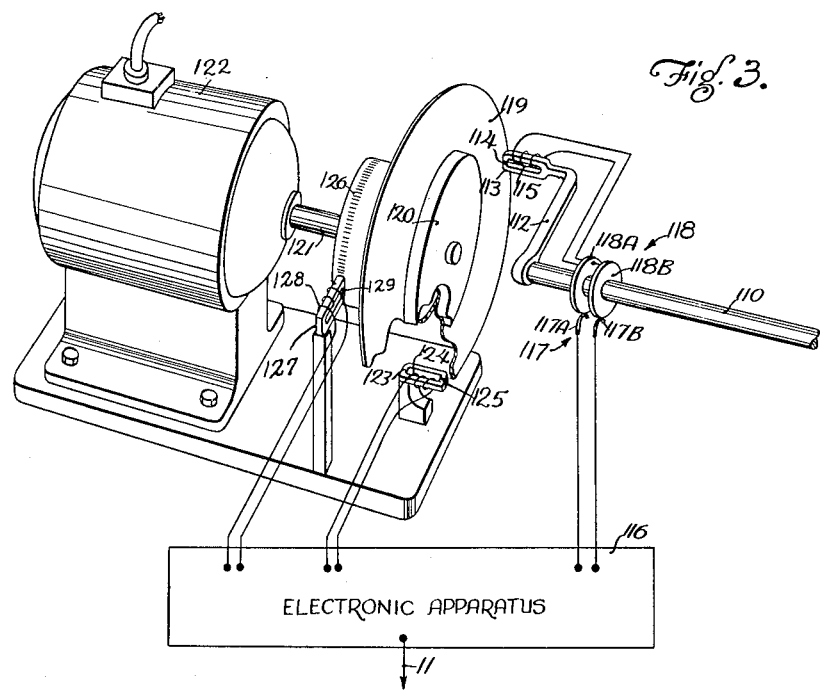
Figure 3 is yet another embodiment of the invention.

Referring first to Figure 1 there is illustrated an input shaft 10 which is supported in suitable bearings (not shown) and which may assume any angular position under the action of auxiliary equipment. The exact nature of the auxiliary equipment is not the subject of the present invention. The movement of the auxiliary equipment need not be angular, so long as the movement is suitably translated to shaft 10. However, angular position will be referred to hereinbelow for purposes of explanation. Accordingly, the function of the components now to be described is to provide an indication of the relative angular position of shaft 10 with respect to an arbitrary reference position or "zero."

In the apparatus of Figure 1 the shaft position indication is provided over output line 11 in the form of a series of pulses, the number of such pulses being the desired indication. These pulses may be used for a variety of purposes which again are not the subject of the present invention; as a typical illustration they may be used to operate an electronic counter which may be any of a number of types which are well known in the art. Representative counters may be understood with reference to United States Patents 2,404,697, 2,404,918, or 2,470,716. The output of the counter in digital form may be related to the number of degrees rotation or the like of the auxiliary equipment.

The pulses on line 11 are obtained as follows: Rigidly mounted upon input shaft 10 and rotated with it is an arm 12 at the end of which is placed a permanent magnet 13. This magnet may have any appropriate form as is well known to those skilled in the art; in Figure 1 the magnet 13 is shown in the form of a ring, which is very nearly but not completely closed, there being a gap 14 at one position thereof facing outwardly from the input shaft 10. Another similar magnet 15 having a gap 16 therein is placed near the arc described by the rotating magnet 13. Magnet 15 is fixed in position and is oriented so that its gap 16 is on the side closest to or facing the input shaft 10.

Co-axial with input shaft 10, but not otherwise connected to it is another shaft 20 which is conveniently supported and is adapted to be rotated continuously at a relatively high speed by some suitable means such as an electric motor 21. This shaft carries a cylindrical disc 22 having mounted thereon a stud 23, an electro-magnet 24 mounted on stud 23, and a slip ring assembly 25 consisting of two slip rings 25a and 25b. Magnet 24 is also of ring shape but has two diametrically opposite gaps 26 and 27 and is provided with a winding schematically illustrated at 28. Magnet 24 is not of the permanent variety but rather is made from magnetically permeable material and preferably is laminated for reasons which are well known in the art. As shown in Figure 1, gaps 26 and 27 pass closely adjacent gaps 14 and 16, respectively. The ends of winding 28 are connected to the aforementioned slip rings 25a and 26b. The brush associated with 25b is grounded and the brush associated with 25a is brought out to control lead 30.

The external periphery of disc 22 is provided with a magnetic surface 40, this surface being provided for the generation of counting pulses for reasons which become more fully apparent below. Surface 40 may be provided in any conventional manner, as by electro-plating a suitable para-magnetic substance or by mounting thereon a length of magnetizable tape of the variety commonly used in sound recording telegraphophones. This surface 40, which may be termed a magnetic track is provided with a number of equally spaced permanently recorded magnetic flux spots thereon, these spots being previously recorded, as at the time of manufacture of the apparatus. Cooperating with track 40 is another ring type electro-magnet 41 similar in structure to magnet 24 except that it has but one gap therein as shown at 42. Gap 42 will be closely adjacent but not in contact with surface 40. As will be well understood by those skilled in the art, as disc 22 is rotated by motor 21 a series of pulses will be generated in a winding 43 on magnet 41. Since the flux spots on surface 40 are equally spaced, the pulses in winding 43 will occur at equal intervals of time and will be synchronized with the rotary movements of shaft 20 and all components carried thereby.

Another means of generating synchronizing pulses may be to replace the magnetizable surface 40 of disc 22 with a mild steel ring having transverse grooves milled therein. That is, for example, the circumferential surface of the index ring may be accurately scribed as by a gear-hobbing process with a plurality of fine grooves equally spaced and accurately meshed. As a practical example, these grooves may be cut as many as 80 per circumferential inch. In conjunction with this type of index ring the magnet 41 may be replaced with a so-called variable-reluctance type reading magnet. This type of reading magnet will be well understood by those skilled in the art, it being an arrangement wherein a permanent magnet causes fringing flux from the gap to link portions of the index ring, the result being that the passing of each of the just-mentioned grooves adjacent the head causes the reluctance to vary thereby altering the flux and inducing a voltage in the winding on the magnet.

The arm 12 and the stud 23 are to be so dimensioned that the arc described by the outmost portion of the ends of magnet 13 forming gap 14 lies just within the concentric arc described by the portions of magnet 24 forming gap 26. This is necessary in order that coil 28 may perform its proper function, which is to produce a brief pulse on lead 30 once during each revolution of shaft 20 irrespective of the angular position of input shaft 10. In order to do so with a maxium signal amplitude and resolution it is clear that the tips of gap 26 must pass the tips of gap 14 as closely as possible while not actually touching. In practice, a clearance of from .001 to .003 inch is quite satisfactory. A similar situation exists with respect to the tips of gap 27 and the tips of gap 16, and magnet 15 should be located accordingly. Furthermore, for the practice of the embodiment illustrated in Figure 1, it is necessary that magnet 15 be so oriented as regards its north and south poles that the pulse produced in winding 28 when magnet 24 scans by magnet 15 is opposite in polarity to that produced when this magnet scans by the permanent magnet 13.

The electronic equipment shown in block diagram form in Figure 1 is based upon circuit components which are well known in the art and therefore it is believed unnecessary that they be detailed herein. Furthermore, this choice of electronic apparatus may be varied within the scope of this invention and the equipment here shown has been selected primarily for its use in illustrating the invention and may not necessarily be a preferred form for certain specialized types of application.

The output of lead 30 is led into two discriminator circuits 31 and 32. Circuit 31 is a plus-pulse discriminator and produces an output signal on lead 33 only when the incoming pulse from lead 30 is of positive polarity. Such a unit may comprise a saturating amplifier biased well below cut-off. On the other hand, circuit 32 is a minus-pulse discriminator capable of passing a signal to lead 34 only when the incoming signal from lead 30 is of negative polarity. Such a negative discriminator may comprise a saturating amplifier with positive bias, followed by a phase inverter in the event that the output signals on leads 33 and 34 are required to be of the same polarity to drive the subsequent apparatus 35.

The object of discriminators 31 and 32 is to provide separate indications over leads 33 and 34, respectively, a signal over lead 33 indicating that magnet 24 is sweeping by permanent magnet 13, whereas a signal on lead 34 indicates that magnet 24 is then sweeping by permanent magnet 15. Stated otherwise, the presence of a pulse on 33 indicates that the scanning magnet 24 is sweeping by the actual position of input shaft 10, whereas a pulse on lead 34 indicates that magnet 24 is sweeping by the reference or zero position.

Block 35 represents a trigger circuit or "flip-flop" such as the classical circuit of W. H. Eccles and F. W. Jordan, first published in "Radio Review" in 1919. This circuit comprising two tubes having cross-connected anodes and grids, assumes a normal or "unset" condition until signalled by lead 33; which then changes to the "set" condition where it remains until a signal arrives over lead 34 and causes it to revert to the normal or unset condition.

Block 36 represents a gating circuit which is well known in the art and which may be built in any of a great variety of forms. This gate "opens" to allow pulses from winding 43 of magnet 41 to pass over lead 44 and through gate 36 to output lead 11 whenever flip-flop 35 is in the set condition, but when 35 is unset, then 36 closes and precludes the passage of additional pulses. The previously mentioned coil 43 of magnet 41 is connected over line 44 as a second input of gate 36.

From the foregoing it will be apparent that the scanning of magnet 24 past permanent magnet 13 may be arranged to open gate 36 and causes a series of pulses to begin to be emitted over lead 11. However, the subsequent passage of magnet 24 past permanent magnet 15 causes these pulses to cease.

Since the spacing of the flux spots on track 40 (or the grooves in a milled index disc) will be equidistant, it follows that the number of pulses appearing on lead 11 will be determined solely by the angular distance from magnet 13 to fixed magnet 15. In actual practice, a disc 22 of about 3 inches in diameter is more than adequate for the placement of 1,000 such spots, in which case a count of the number of pulses emitted over lead 11 will be an indication to within one part in a thousand, or 0.1% of the total 360 degrees arc relative to the arbitrary zero position indicated by magnet 15. Furthermore, the pulses obtained from winding 43 of magnet 41 may be multiplied to make it appear that more spots exist on the surface 40 of disc 22. Pulse multiplication will be fully understood by those skilled in the art. A typical speed for motor 21 is 3,600 R. P. M., in which case the pulses appearing on lead 11 will be at a basic rate of 60 kilocycles per second which is well within the limitations of present technical advances in the art.

It is clear that this invention may be practiced without necessarily employing permanent magnets as illustrated by 13 and 15. For example, these may be electromagnets carying a substantially constant current, although in this case it would be necessary to energize 13 by means of some slip rings mounted on shaft 10, thereby additionally loading shaft 10, which additional loading mey be a distinct disadvantage. As another very practical alternative, the arm 12 may be altered so as to comprise an entire disc, similar in shape to disc 22, and having a magnetic periphery with a single spot permanently magnetized thereon similar to the technique utilized in effecting the permanent magnetization of the equi-spaced spots shown at 40; similarly the function of 15 may be equally well accomplished by the use of another disc (stationary) having a single spot permanently magnetized thereon.

Figure 2 illustrates another structure which is the functional equivalent of Figure 1, except that certain parts are rearranged. It is to be generally considered that Figure 1 represents a preferred stucture in the event that the input shaft 10 is capable of delivering only limited amounts of power; this is true because shaft 10 is not burdened with any slip rings and cooperating brushes, and since furthermore the rotational inertia of shaft 10, arm 12 and magnet 13 may be held to a minimum by judicious engineering design. On the other hand, Figure 2 may be generally considered a preferred practice of this invention in the event that input shaft power is not so limited and in the event that simplification of the electronic equipment is desired in the interest of cost production. The reasons for this will become apparent upon consideration of the following description.

Referring to Figure 2, the arm 12 has provided at its outer end a structure which includes a magnetic ring 50 almost but not completely closed, leaving a gap 51 at the portion furthermost from shaft 10. Magnet 50 may resemble magnets 13 and 15 in shape, but will not be a permanent magnet. Magnet 50 is provided with a coil 52, the output of this coil leading to slip rings 55 and 56, the first of which is grounded and the second of which is capable of applying a signal over lead 57.

As in the case of Figure 1, there is also provided an auxiliary shaft 20 which is constantly rotated at a relatively high speed by motor 21, the shaft 20 in turn driving disc 22 (having a magnetic periphery 40 or a milled disc) and a stud 23. At the end of stud 23 is mounted a magnet 58 having two gaps which is similar in shape to the structure of magnet 24 of Figure 1, but which is actually a permanent magnet rather than of a magnetically permeable material. Magnet 58 is oriented so that it presents one gap at the portion nearest to shaft 10 and the other gap at the portion furthest from shaft 10. In close proximity is mounted a stationary magnet structure 59 having thereon a coil 60, this magnet structure being provided with a gap which is oriented in the direction nearest to shaft 10. The coil 60 of magnet 59 is capable of producing a signal over lead 61.

Magnets 50, 58 and 59 are arranged in close proximity and so oriented that they cooperate as follows: As permanent magnet 50 sweeps by the magnetic structure 50, it induces a voltage pulse in coil 52 which is transmitted via slip ring 56 to lead 57, and as permanent magnet 58 sweeps past magnetic structure 59 it induces in coil 60 a voltage pulse which appears on lead 61. The polarity of the pulses thus appearing on leads 57 and 61 may be made as desired in accordance with the subsequent electronic apparatus by proper choice of the connections leading to coils 52 and 60.

Leads 57 and 61 then become the two input leads to a trigger circuit or flip-flop 35, similar in all respects to that which has been previously described in connection with Figure 1. Flip-flop 35 in turn controls the action of a gate 36, the other input of which is received from a magnetic structure 41 which again is similar to that previously described. Finally, the output pulses indicative of the shaft rotation of input shaft 10 appear on output lead 11. The cooperation of flip-flop 35, gate 36 and magnetic structure 41 with its associated track 40, to produce the desired results on output lead 11, are exactly as earlier described in connection with Figure 1, and need not be repeated here.

It may be that in measuring very small angles where the magnetic member on the input shaft and the fixed magnetic member are adjacent each other the magnets may so interact that the otherwise fine resolution is impaired. However, 360 degrees of rotation of the auxiliary equipment which turns shaft 10 may be accurately measured throughout the 360 degrees by providing suitable reduction gearing to shaft 10 so that the usable range of movement of magnetic member 13 (Figure 1) or 52 (Figure 4) need not come adjacent the fixed magnetic member. This arrangement may be useful where the auxiliary equipment oscillates 360 degrees but does not continue to rotate beyond 360 degrees.

Referring again to Figure 1, a further embodiment of the invention may be to replace conventional flip-flop 35 with a so-called integrating flip-flop. Integrating flip-flops are well known in the electronic art, these being circuits which are set by a negative pulse on a single input line, and reset by a subsequent positive pulse on the same input line. By use of such a circuit the discriminators 31 and 32 may be dispensed with.

Yet another embodiment of the invention will now be described:

Referring first to Figure 3, there is illustrated an input shaft 110 which is supported on suitable bearings (not shown) and which can assume any desired angular position under the control of some auxiliary equipment, the exact nature of which is not the subject of the present invention. It is the object of the present invention only to provide an indication of the relative angular position of shaft 110 (with respect to an arbitrary reference position of "zero"). As an example, the auxiliary equipment may be a device for indicating the direction of wind. In the apparatus of Figure 3, this indication is provided over an output line 111 in the form of a series of pulses, the number of such pulses being the indication sought. These pulses may be used for a variety of purposes which again are not the subject of the present invention; as a typical illustration they might be used to operate an electronic counter which may be any of a number of types which are well known in the art. For example, suitable counters may be understood with reference to the above mentioned patents.

The pulses on line 111 are obtained as follows: Rigidly mounted upon input shaft 110 and rotatable with it is an arm 112 at the end of which is placed an electro-magnet 113. This magnet may have any appropriate form as is well known in the art; in Figure 3 the magnet 113 is shown in the form of an elongated ring, which is very nearly but not completely closed, there being a gap 114 at one portion thereof. Energization for a coil 115 of this electro-magnet is obtained from an electronic circuit 116 which will be more fully described in connection with Figure 4. The connection of coil 115 with circuit 116 is through brush-slip ring assemblies 117 and 118, respectively, consisting of brushes 117A and 117B and slip rings 118A and 118B.

The gap 114 of electro-magnet 113 faces one surface of a very thin electrically conductive annular disc 119, which disc is coated on the side adjacent gap 114 with a substance capable of retaining a high degree of permanent magnetization but which is yet capable of being altered as to the degree or direction of magnetization when suitably acted upon. Disc 119 may be conveniently termed a scanning disc carrying a record retaining member. The disc 119 need be no thicker than that which is required to maintain a reasonable degree of rigidity; it has been found that a disc of 0.005 inch thick works very well in the practice of this invention. This disc is clamped or otherwise secured into a structure comprising a drum 120 carried by rotating shaft 121, which shaft is driven at a relatively high rate of speed (such as 3600 R. P. M.) by a suitable driving source such as motor 122. The input-shaft structure (comprising input shaft 110, arm 112 and magnet 113) and the scanning structure (comprising drum 120, magnetic disc 119 and shaft 121) are so organized and arranged that shafts 110 and 121 are co-axial and so that the gap 114 is positioned in very close proximity to the surface of magnetic disc 119, the clearance between the gap 114 and disc 119 being of the order of 0.002 inch irrespective of the angular position of arm 112. Under these conditions, it is possible for the electro-magnet 113 to influence the magnetic disc 119 to such an extent that the latter retains an induced flux record of the direction of energization of the former. This record may be considered as "permanent" except that it may be subsequently altered by further influence of magnet 113 or the other magnets to be described below. Methods and apparatus for so magnetizing and altering are further described at considerable length in the following United States Patent, No. 2,540,654 and in the copending patent applications Serial No. 16,997 of Coombs et al., filed March 25, 1948, Serial No. 118,034 of Field et al., filed September 27, 1949 and Serial No. 90,941 of Coombs, filed March 2, 1949.

On the opposite side of disc 119 there is mounted another ring electro-magnet structure 123, similar in all respects to magnet 113. Magnet 123 is provided with a gap 125 therein facing the disc 119, and is also provided with a coil 124. As with the gap 114, of magnet 113, the gap 125 is placed in very close proximity to the plane of disc 119, for example, with a clearance of again about .002 inch. Provided disc 119 is made of some thin metallic substance of high electrical conductivity and further provided that it is coated on the side next to magnet 113 with a substance of high magnetic retentivity, it will be found that magnetic marks "written" by magnet 113 on one side may be subsequently read by magnet 123 on the other side, all in accordance with the techniques outlined in aforementioned patent and patent applications. Preferably the disc 119 is of non-magnetic material, for reasons which appear hereinbelow. As will be explained hereinafter, the magnetic marks recorded by magnet 113 are subsequently read by magnet 123 and it is the distance which said marks must travel between the recording magnet 113 and magnet 123 that determines the number of output pulses which eventually will appear on output lead 111.

The arrangement of magnets 113 and 123 on opposite sides of the discs 119 is an important feature of the invention, inasmuch as a full 360 degrees of operation is permitted.

Also mounted on shaft 121 is a disc 126 having a periphery which may be coated with a magnetic substance similar to that used in coating the thin disc 119, which surface may be produced either by electro-plating a suitable paramagnetic substance or by mounting thereon a short length of tape of the variety commonly used in sound recording telegraphophones. On the surface of disc 126 are permanently recorded a number (such as about 80 per circumferential inch) of equally spaced magnetic spots. This recording may be accomplished at the time of manufacture. Cooperating with disc 126 is another electro-magnet 127 having a coil 128 and a gap 129 facing the disc 126. The spacing of the gap is again in accordance with the above mentioned patent and applications.

Another means of generating synchronizing pulses may be to replace the magnetizable surface of disc 126 with a mild steel ring having transverse grooves milled therein, in the manner referred to above.

In the case of each above mentioned electro-magnetic transducers, the gaps are positioned at right angles to the direction of movement of the magnetizable surface.

Figure 4:
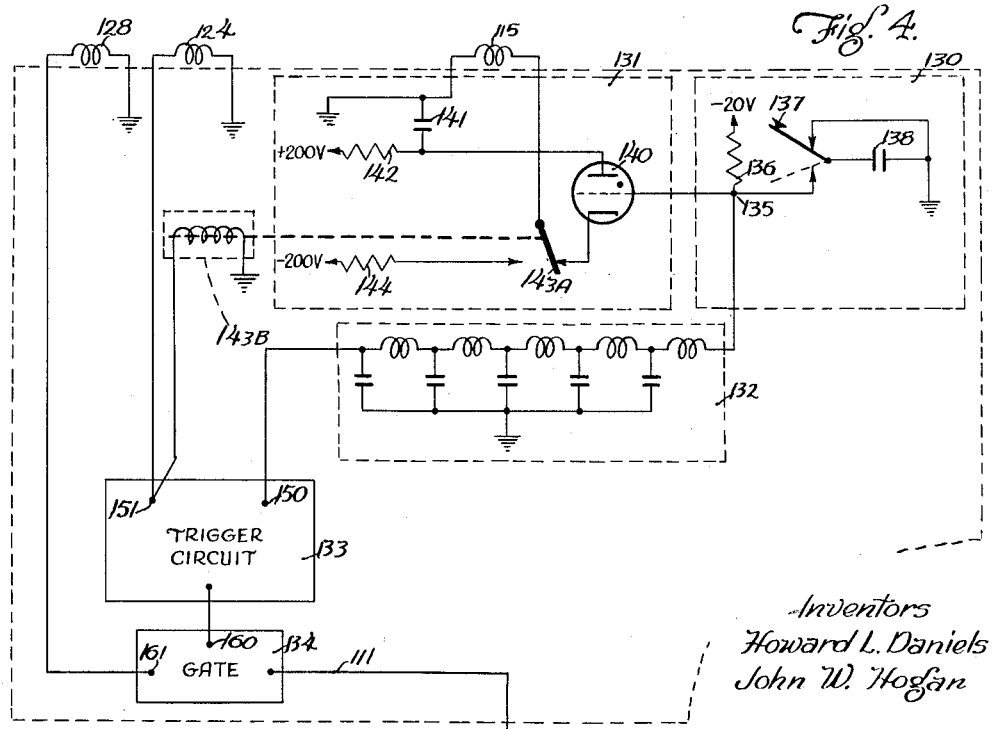
Figure 4 is a diagram of a circuit employed with the embodiment of Figure 3.

Referring now to Figure 4, this shows in detail the circuitry which is indicated by block 116 in Figure 3. This circuitry is that employed in connection with the electromagnet coils 115, 124 and 128. It will be understood that this circuitry is merely illustrative and is not to be interpreted as a limitation upon the scope or practice of this invention.

The circuit illustrated comprises a cycle-initiating circuit 130, a write/erasing circuit 131, a delay circuit 132, a trigger circuit 133 and a gate circuit 134, all operating from magnet coils 115, 124 and 128 into the output line 111. The purpose of the initiating circuit 130 is to supply a brief pulse at the time that it is desired to initiate a cycle of operation. Circuit 130 may comprise a junction 135, normally maintained at some convenient slightly negative voltage (—20 volts for example) through resistance 136. However, when an initiating key 137 is operated to the chain line position in Figure 4, junction 135 assumes a potential of substantially zero volts for a time determined primarily by the time constant of resistor 136 and a condenser 138, this time duration being independent of how long the key 137 is closed. When key 137 is released, nothing further happens to junction 135; however the key upon reaching its uppermost position serves to discharge condenser 138 so as to prepare it for the next cycle of operation. Obviously, there are other circuits for accomplishing the same function, as is well known to those skilled in the art, and no limitation is intended to the circuit shown.

The write/erase circuit shown schematically in box may comprise a thyratron tube 140 operating in a discharge circuit comprising the condenser 141 and the resistance 142. Switch 143a, which is the transfer blade of a relay more fully described hereinbelow, normally connects one side of the writing/erasing magnet coil 115 to the cathode of thyratron 140, the other side of coil 115 being grounded. This discharge circuit is thus connected between ground at coil 115 and a positive potential such as +200 volts at resistance 142. As is well known in the art, when such a thyratron circuit is discharged by the action of initiating circuit 130 the junction 135 of which circuit is connected to the control grid of tube 140, a very brief pulse is caused to pass through the winding of coil 115, the duration of such a pulse being primarily controlled by the resonant frequency of the circuit comprising coil 115 and condenser 141. As will be understood by those skilled in the art, it is readily possible to make such a pulse having a duration of only a few microseconds. This will place a mark of a given polarity on disc 119.

As will be more fully explained hereinbelow, prior to each contemplated operation of the thyratron 140 switch 143a is moved to its left-hand position in Figure 4, where it remains for at least one full revolution of disc 119. Under these conditions, it will be seen that current of opposite polarity flows to a source of negative potential via a resistor 144 and through coil 115, thereby effectively "erasing" the entire disc 119 to a condition of previous magnetic polarity.

The net effect of thyratron 140 is to cause magnet 113 to "overwrite" a very small portion of disc 119 with magnetism of polarity opposite to the polarity previously existing. Stated otherwise, after the preliminary erasing operation (switch 143a to the left for at least one full cycle) and after the subsequent writing operation (switch 143a to the right while thyratron 140 is discharged) an examination of disc 119 will show that substantially all of it is in one condition of magnetization (the so-called erased condition) but that one small spot is in the opposite condition. This portion of opposite magnetization is utilized to excite the reading magnet 124 for purposes to be more fully explained hereinbelow.

Returning now to junction 135 in circuit 130, it will be seen that this is also connected to one end of a delay-line 132. Line 132 is schematically illustrated by the plurality of condensers and inductances. Such a delay line is described more fully in the following patents: Nelson 2,240,559 and Kallmann 2,461,061. As an alternative, delay line 132 may also be constructed on acoustic or supersonic principles, such as those described in the patent to Mason, 2,503,831. The purpose of delay line 132 is to delay the signal from junction point 135 for a very brief amount of time (such as about 6 to 8 microseconds) after which the signal may be permitted to pass to input terminal 150 of trigger circuit 133. The reason for so delaying the junction 135 signal is explained in full herein-below.

Trigger circuit 133, more popularly known as a "flip-flop," is well known in the art, having first been described by W. H. Eccles and F. W. Jordan in "Radio Review" in 1919. Circuit 133 assumes a normal or "unset" condition until it receives the delayed signal input at 150 from delay circuit 132; it then changes to the "set" condition where it remains until a signal arrives from magnet coil 124 at input terminal 151 of circuit 133, the latter causing this circuit to revert to its normal or unset condition.

134 represents a gating circuit which is well known in the art and which may be built in any of a great variety of forms. Such a circuit comprises two input circuits 160 and 161, the former being connected to the output of trigger circuit 133 and the latter being connected to the output of magnet 128. The gating and the trigger circuit cooperate in such a manner that, whenever the trigger circuit is in the normal or unset condition nothing may appear over output lead 111, whereas if circuit 133 is in the set condition the gate thereupon opens and permits pulses arriving at input terminal 161 to pass through from the output terminal on to output lead 111.

To recapitulate the foregoing, the cooperation between the mechanism of Figure 3 and the electronic apparatus of Figure 4 is as follows. The initiating pulse arising from circuit 130 simultaneously activates the write/erasing circuit 131 and the delay line 132. The former causes writing magnet 113 to write a small flux spot on disc 119, which spot is of magnetic polarity opposite to that of the remainder of the disc 119. The location of this spot is the portion of disc 119 which was immediately adjacent to magnet 113 at the instant that coil 115 was pulsed. Rotation by motor 122 causes this spot of opposite polarity eventually to arrive opposite gap 125 of magnet 123, whereupon coil 124 picks up an electro-magnetically induced signal which (possibly after amplification) is passed to input terminal 151. The number of signals appearing at input 161 of gate 134 during the time that it takes the spot of opposite polarity to travel from magnet 113 where it is written to magnet 123 where it is read is an indication of the angular position of shaft 110 with respect to an arbitrary reference or "zero" located opposite magnet 123.

After magnet 124 has been excited by the passage of the spot on disc 119, there is no further need for the preservation of this spot and, in fact, it is necessary that this spot be erased in order to prepare the apparatus for a subsequent usage. To accomplish this, all that is necessary is to move switch 143a from its normal (right) position to the "erase" or left position, and to hold it in this left position for at least one full revolution of disc 119 (i. e. for at least $\frac{1}{60}$ of a second when shaft 121 turns at 3600 revolutions per minute) after which it may be permitted to return to its normal position and the apparatus will be found to be ready for a second usage. There are a great many ways for accomplishing this and many variations will occur to those skilled in the art. As an illustration only of one such possibility, there is shown also connected to terminal 151 a delay relay 143b, the delay giving it the property of rapid closing followed by a slow release time. It is readily possible to design such a relay so that it will close in a few milliseconds and remain closed for a safe margin over one full revolution of disc 119 after which it will release.

Connection may also be made to the erasing circuit for resetting to zero the counter or other indicating device connected to line 111.

As hereinbefore stated the initiating pulse from circuit 130 also feeds delay line 132 simultaneously with the writing action of circuit 131. After a very brief interval of time (the purpose of which will be hereinafter explained) this pulse appears on input 150 of the trigger circuit 133. This input pulse causes the trigger circuit to assume its "set" condition, which in turn opens the gate 134, thereby allowing pulses arising from the cooperation of disc 126, magnet 127 and coil 128 to pass through this gate from its input circuit 161 to its output lead 111. These pulses continue to feed through the gate 134 until such time as the previously described signal from magnet coil 124 arrives at input circuit 151 of trigger 133, thereby causing the latter to resume its unset condition and to close the gate 134, thereby terminating the stream of pulses leaving over output lead 111. Stated otherwise, evenly spaced output pulses begin to leave over output lead 111 very nearly as soon as the writing magnet 115 operates; these pulses cease to leave output lead 111 when the spot so written arrives at reading magnet 123 as the result of the rotation of magnetic disc 119.

By the apparatus as thus far described, it will be apparent that very accurate angular indications may be obtained over 360 degrees of rotation of shaft 110.

It may be found, however, that when the input shaft 110 has assumed a position of very nearly zero degrees rotation, or very nearly 360 degrees of rotation, with respect to the arbitrary "zero" determined by the position of magnet 123, the writing action of magnet 113 may directly influence the reading magnet 123, thereby possibly giving rise to readings of slightly diminished accuracy in such cases. Stated otherwise, there exists a small region of from about 358 degrees to 002 degrees where magnets 113 and 123 are substantially face-to-face and each apparatus may tend to affect the operation of the other.

When the magnets 113 and 123 are substantially face-to-face one result may be a reduction in the amplitude of the signal produced by the reading magnet 123. Apparently the cause of this phenomenon is that when the writing head is substantially face-to-face with the reading head the writing head serves as a shunt path for flux which would otherwise link the reading head winding. This action is accentuated because the magnetic mark when in a position between the face-to-face magnets is at a greater distance from the reading magnet than from the writing magnet. The greater distance is caused by the fact that the disc 119 must have some thickness. For example, the disc 119 may be 0.005 inch thick, meaning that if the magnets 113 and 123 are each spaced 0.002 inch from the opposite surfaces of disc 119 then magnet 113 is spaced only 0.002 inch from the magnetizable surfaces while the magnet 123 is spaced 0.007 inch from the magnetizable surface.

While the reduction of amplitude of the signal may have the effect of causing difficulty in discriminating between such reduced-amplitude signals and noise signals existing on the disc 119, this difficulty may be readily overcome by thoroughly erasing the disc 119 after each operation. If desired, a separate erase magnet may be installed in a fixed position facing the non-coated side of disc 119, and may be operated by any obvious and suitable connection with the previously mentioned relay coil 143b.

Another result of the reduction of signal amplitude when the magnets 113 and 123 are substantially face-to-face is that portions of the leading edge of small amplitude pulses generated in coil 124 of magnet 123 will be delayed compared with portions of the leading edge of larged amplitude pulses resulting from operations when the magnets 113 and 123 are not face-to-face. In other words, it is usually necessary for flip-flop triggering purposes that the amplified signals from coil 124 be eventually clipped to form pulses of uniform amplitude. This, in fact, will be in order to correct for the signal amplitude variation which is noted above. The pulses may, before clipping, be of approximately the same time duration regardless of amplitude. However, clipping will cause the effective leading edge of clipped large amplitude pulses to occur earlier than the effective leading edge of the equivalent clipped small amplitude pulses. The just mentioned effect may be minimized, however, by including further amplification before clipping. Referring to Figure 4, suitable amplifying and clipping circuits may be connected in the line extending between coil 124 and terminal 151 of circuit 133.

Another result of operating the apparatus when the magnets 113 and 123 are substantially face-to-face is that when writing occurs the magnetic field set up by the writing magnet links the reading magnet winding. This linking field induces in the reading magnet coil an oscillating surge and this oscillating surge may also appear in any transformer in amplifying circuits connected with the reading magnet. The oscillating surge may be expected to die out exponentially in several microseconds. Inasmuch as the oscillating surge may impair the operation of the coil 124 and amplifying circuits connected therewith the previously mentioned delay circuit 132 may be provided to disable the gate 134 until such disturbances have disappeared. In other words, to overcome the possibility of any such disturbances of the apparatus it is only necessary that the electronic apparatus comprising trigger circuit 133 and gate circuit 134 be rendered inoperative for a very brief period of time corresponding to that in which the writing action magnet 113 is taking place.

Moreover the oscillating surge mentioned in the preceding paragraph may be reduced by a large factor by making the disc 119 of a non-magnetic but high electrical conductivity material. Eddy current effects resulting from the use of such material will largely repel flux from the writing magnet which otherwise would link the reading magnet to cause the oscillations. Thus, a 0.005 inch thick Phosphor bronze disc may be employed to advantage.

As a practical example, with the rotating assembly of Figure 3 operating at 3600 R. P. M. and with 1000 equally spaced permanently recorded spots on the periphery of disc 126, it follows that magnet 127 is generating output pulses at the rate of 60,000 per second, or one every 17 microseconds. Such figures are typical for an apparatus designed to indicate shaft position of input shaft 110 with an accuracy of 0.1% and with results available (if desired) as often as 20 times per second. Since the pulses indicative for rotation of one part in a thousand require timing intervals or 17 microseconds and since the writing operation of magnet 113 is completed in well under half this amount, it is obvious that the desired results can be attained in any event simply by delaying the beginning of the timing operation (as determined by trigger circuit 133) until after the writing operation has been completed by magnet 113. To do this, the signal from 130 is delayed by not more than one-half a pulse-interval of pulses generated in coil 128. This is the sole purpose of delay line 132 which, for the typical figures cited above, would have a total delay of not more than 8 microseconds.

Where finer resolution is desired, possibly requiring that the delay period exceed the coil 128 pulse repetition period, such delay may be tolerated and compensated for (and the delay mentioned in the preceding paragraph may be similarly compensated for) by angularly offsetting the arm 112 relative to shaft 110. The offsetting will be through an angle corresponding to the angle through which the disc 119 rotates in the delay time period. The offset angle should be in a direction opposite to the direction in which the disc 119 rotates. In any installation such offsetting of the arm 112 is advantageous in that where the measurement of small angles is involved the opening and closing of gate 134 is controlled only by the sequence of occurrence of leading edges of electrical pulses. Obviously, the discrimination between leading edges of electrical pulses is much finer than where relatively broad faced magnets are involved.

As compared with the above described embodiments the present embodiment may be considered an improvement in that it offers more accurate indications under certain conditions of operation. If the input shaft 110 is stationary, or if it moves at speeds of generally less than about 2 revolutions per minute, equally precise measurements will result from the practice of either invention. However, if input shaft 110 is rotating at a velocity in excess of this figure (which is computed on the basis that motor 122 rotates at 3600 R. P. M. and that disc 126 contains 1000 equally spaced spots) it will be found that the practice indicated in the first described embodiments will result in errors which may become appreciable. The source of such errors lies in the fact that the previously described embodiments use apparatus which does not respond instantaneously to the command to initiate the reading operation; instead it responds at some indefinite time during the following 1/60 of a second. Stated otherwise, when the reading action is initiated this reading may take place instantaneously or it may take place as late as 1/60 of a second later, or at any intermediate time, depending on when the scanning magnet of that invention passes the magnet attached to the input shaft. This indefinite delay in complying with the reading command may create an error if input shaft 110 happens to be rotating faster than 2 revolutions per minute. In the present embodiment, however, the reading action begins instantaneously. Thus, the results from use of the present embodiment are indications of the position of the shaft as of the time that its measurement is desired and not at some indefinite time thereafter.

For certain applications there are obvious simplifications of the previously described apparatus. For example, it may be desired to read indications of an instrument which has a scale which extends through substantially less than the full 360 degrees. Such an instrument might comprise a weighing device having a range of from 0 to 100 lbs., with both the zero and 100 lb. indicia near the bottom of the scale, the distance between them being equivalent to 330 degrees, and with a blank space of 30 degrees between these maximum and minimum indicia. If such an instrument is coupled to the input shaft 110 of the apparatus of this invention, it follows that magnet 113 and magnet 123 will never approach each other very closely. Under such conditions it is possible to dispense altogether with delay line 132. Also, a full 360 degrees of rotation of the equipment turning input shaft 110 may be similarly measured without magnet interference by providing suitable reduction gearing at shaft 110. Additionally, it is possible to effect some simplification of the relay comprising the points 143a and coil 143b by allowing magnet 113 to carry an erasing current at all times, which erasing current will be over-ridden by the action of oppositely directed current controlled by the writing thyratron 140.

In all of the embodiments described hereinabove, it will be apparent that the functions of the fixed and movable members which control the gating circuits may be readily interchanged. That is, it is necessary only that the members be relatively movable.

Upon reading this specification many additional embodiments of the invention will occur to others. Therefore it is intended that the scope of the invention be limited only by the appended claim and not by the limited number of embodiments described hereinabove. It will be apparent that basically a position within the limits of a given distance of travel is measured by counting off subdivisions of the given distance of travel. The electromagnetic techniques hereinabove described have preferable characteristics for carrying out the function of the invention, inasmuch as mechanical interaction of parts is at a minimum and also the bulk and complexity of the components is reduced over other embodiments.

We claim:

In apparatus having a first magnetic transducer movable with an input member for writing a magnetic spot on a cyclically revolving member and having a second magnetic transducer fixedly positioned for reading the recorded spot for determining a period for counting a number of pulses generated synchronously with the motion of said member, a combined writing and erasing circuit for operating the first transducer comprising a condenser connected across a source of potential, means for connecting the condenser in series with the winding of the first transducer and the anode-cathode path of a controllable electron-discharge tube whereby pulses of a current in a given direction will flow through the winding of the first transducer upon discharge of the condenser through the discharge tube, and means responsive to the generation of a signal in the second transducer for disconnecting the winding of the first transducer from the said series circuit and for connecting said winding of the first transducer into a circuit connected to carry current in a direction opposite to the direction of said pulses of current, the means for connecting the winding of the first transducer into the last-mentioned circuit including means for maintaining the current in said opposite direction for at least one complete cyclic revolution of the travelling member.

References Cited in the file of this patent

UNITED STATES PATENTS

| | | |
|---|---|---|
| 2,089,441 | Smith, Jr. | Aug. 10, 1937 |
| 2,168,149 | Arnold | Aug. 1, 1939 |
| 2,403,889 | Di Totto | July 9, 1946 |
| 2,405,597 | Miller | Aug. 13, 1946 |
| 2,420,509 | Whittaker | May 13, 1947 |
| 2,431,591 | Snyder, Jr. et al. | Nov. 25, 1947 |
| 2,439,446 | Begun | Apr. 13, 1948 |
| 2,609,143 | Stibitz | Sept. 2, 1952 |
| 2,680,241 | Gridley | June 1, 1954 |
| 2,700,148 | Mc Guigan, et al. | Jan. 18, 1955 |